US010401574B2

(12) United States Patent
Gurreri et al.

(10) Patent No.: US 10,401,574 B2
(45) Date of Patent: Sep. 3, 2019

(54) HYBRID FIBER POWER CONNECTION SYSTEM

(71) Applicant: CommScope Technologies LLC, Hickory, NC (US)

(72) Inventors: Michael Lawrence Gurreri, York, PA (US); Robert Charles Flaig, Lancaster, PA (US); Dwight A. Bretz, Hummelstown, PA (US); Eric Ryan Chappell, Statesville, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 15/546,585

(22) PCT Filed: Jan. 26, 2016

(86) PCT No.: PCT/US2016/014960
§ 371 (c)(1),
(2) Date: Jul. 26, 2017

(87) PCT Pub. No.: WO2016/123128
PCT Pub. Date: Aug. 4, 2016

(65) Prior Publication Data

US 2018/0024302 A1 Jan. 25, 2018

Related U.S. Application Data

(60) Provisional application No. 62/107,894, filed on Jan. 26, 2015.

(51) Int. Cl.
*G02B 6/38* (2006.01)
*H01R 33/94* (2006.01)
(Continued)

(52) U.S. Cl.
CPC ......... *G02B 6/3817* (2013.01); *G02B 6/3821* (2013.01); *G02B 6/3825* (2013.01);
(Continued)

(58) Field of Classification Search
CPC ................................ G02B 6/38; H01R 33/94
(Continued)

(56) References Cited

U.S. PATENT DOCUMENTS 5,059,140 A * 10/1991 Philippson ......... H01R 13/6593 439/607.02
5,234,353 A 8/1993 Scholz et al.
(Continued)

FOREIGN PATENT DOCUMENTS

EP 1 199 587 A1 4/2002
GB 2 289 140 A1 11/1995
(Continued)

OTHER PUBLICATIONS

International Search Report and Written Opinion of the International Searching Authority for corresponding International Patent Application No. PCT/US2016/014960 dated May 20, 2016, 9 pages.
(Continued)

*Primary Examiner* — Kaveh C Kianni
(74) *Attorney, Agent, or Firm* — Merchant & Gould P.C.

(57) ABSTRACT

A connector body includes a connector body (111) having a main body (10) and two sub bodies (12) that project from a first side of the main body (10). A latching mechanism (14) at the first side of the main body is positioned between the sub bodies. Electrical conductors (18*a*, 18*b*) are positioned in the sub bodies and have interface ends at a forward face of the main body. First and second ferrules (16*a*, 16*b*) are mounted at the main body. The first and second ferrule are spring biased in a forward direction perpendicular to the forward face of the main body. The first and second ferrules
(Continued)

have interface ends accessible at the forward face. Optical fibers (19*a,* 19*b*) are supported by the first and second ferrules (16*a,* 16*b*).

6 Claims, 2 Drawing Sheets

(51) Int. Cl.
*H01R 13/52* (2006.01)
*H01R 13/625* (2006.01)
*H01R 13/627* (2006.01)
*H01R 24/20* (2011.01)

(52) U.S. Cl.
CPC ......... *G02B 6/3885* (2013.01); *G02B 6/3891* (2013.01); *G02B 6/3893* (2013.01); *H01R 13/5219* (2013.01); *H01R 13/625* (2013.01); *H01R 13/6272* (2013.01); *H01R 24/20* (2013.01); *H01R 33/94* (2013.01)

(58) Field of Classification Search
USPC ........................................................... 385/59
See application file for complete search history.

(56) References Cited

U.S. PATENT DOCUMENTS

| | | | | |
|---|---|---|---|---|
| 5,268,983 | A | 12/1993 | Tatarka et al. | |
| 5,317,663 | A | 5/1994 | Beard et al. | |
| 5,419,717 | A | 5/1995 | Abendschein et al. | |
| 5,970,196 | A | 10/1999 | Greveling et al. | |
| 6,543,941 | B1 | 4/2003 | Lampert | |
| 6,588,938 | B1 | 7/2003 | Lampert et al. | |
| 6,597,844 | B1 | 7/2003 | Witt et al. | |
| 5,813,421 | A1 | 11/2004 | Lail et al. | |
| 6,876,798 | B2 | 4/2005 | Triplett et al. | |
| 7,572,065 | B2 | 8/2009 | Lu et al. | |
| 8,480,312 | B2 | 7/2013 | Smith et al. | |
| 8,509,422 | B2 | 8/2013 | Wang et al. | |
| 8,879,883 | B2 * | 11/2014 | Parikh | G02B 6/4444 385/135 |
| 9,459,411 | B2 | 10/2016 | Smith et al. | |
| 2003/0007738 | A1 * | 1/2003 | Cairns | G02B 6/3816 385/56 |
| 2006/0263011 | A1 * | 11/2006 | Chen | G02B 6/3817 385/75 |
| 2009/0111331 | A1 * | 4/2009 | Aronson | H01R 27/00 439/680 |
| 2010/0081303 | A1 * | 4/2010 | Roth | G02B 6/3817 439/140 |
| 2010/0296779 | A1 | 11/2010 | Lu et al. | |
| 2011/0103797 | A1 * | 5/2011 | Oki | G02B 6/4201 398/79 |
| 2011/0229090 | A1 * | 9/2011 | Isenhour | G02B 6/3821 385/78 |
| 2011/0243505 | A1 * | 10/2011 | Su | G02B 6/3817 385/75 |
| 2011/0243567 | A1 | 10/2011 | Su et al. | |
| 2011/0262077 | A1 | 10/2011 | Anderson et al. | |
| 2011/0293223 | A1 * | 12/2011 | Shimazu | G02B 6/3817 385/81 |
| 2011/0311187 | A1 | 12/2011 | Wang et al. | |
| 2012/0039571 | A1 | 2/2012 | Ciechomski et al. | |
| 2012/0302104 | A1 | 11/2012 | Wu | |
| 2013/0089290 | A1 * | 4/2013 | Sloey | G02B 6/3817 385/74 |
| 2013/0202254 | A1 | 8/2013 | Gurreri et al. | |
| 2015/0147036 | A1 * | 5/2015 | Isenhour | G02B 6/3893 385/79 |
| 2016/0104956 | A1 * | 4/2016 | Santos | H01R 9/0518 324/754.03 |
| 2017/0184798 | A1 * | 6/2017 | Coenegracht | G02B 6/3817 |

FOREIGN PATENT DOCUMENTS

| | | | |
|---|---|---|---|
| WO | 2013/189370 | A2 | 12/2013 |
| WO | 2014/126975 | A1 | 8/2014 |
| WO | 2014/197103 | A2 | 12/2014 |
| WO | 2015120365 | A1 | 8/2015 |
| WO | 2016/063135 | A2 | 4/2016 |

OTHER PUBLICATIONS

"Cloudsplitter—Ethernet and Power Technology", TE Connectivity, 4 pages (2014).
"New product Development and Product advancement—At the speed of light, from Concept, Design, Tooling, Testing and Mass Production", Senko Advanced Components, 40 pages (2014).
"CloudSplitter Hybrid Fiber Power Concept", TE Connectivity, 4 pages (2014).

* cited by examiner

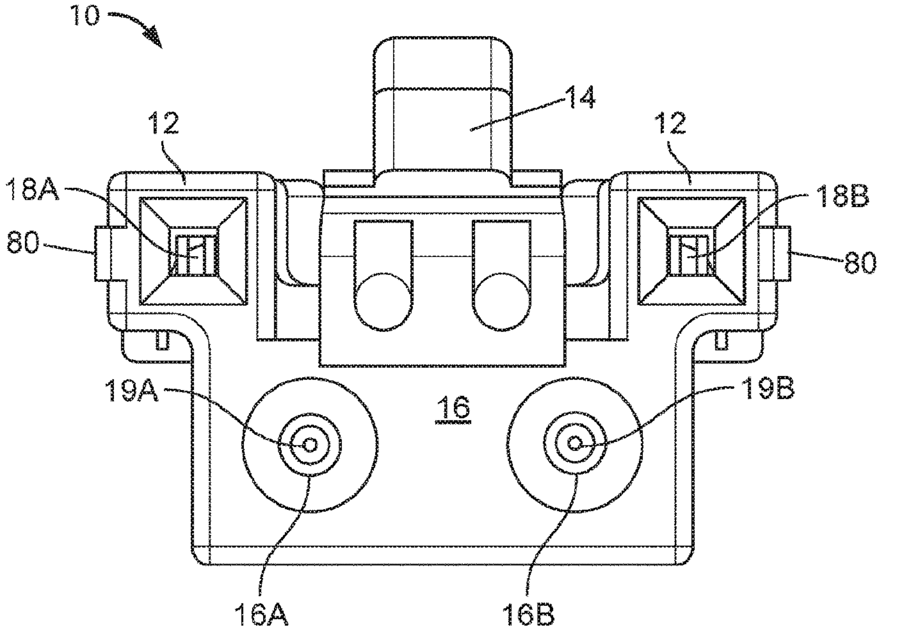
FIG. 1
FIG. 2
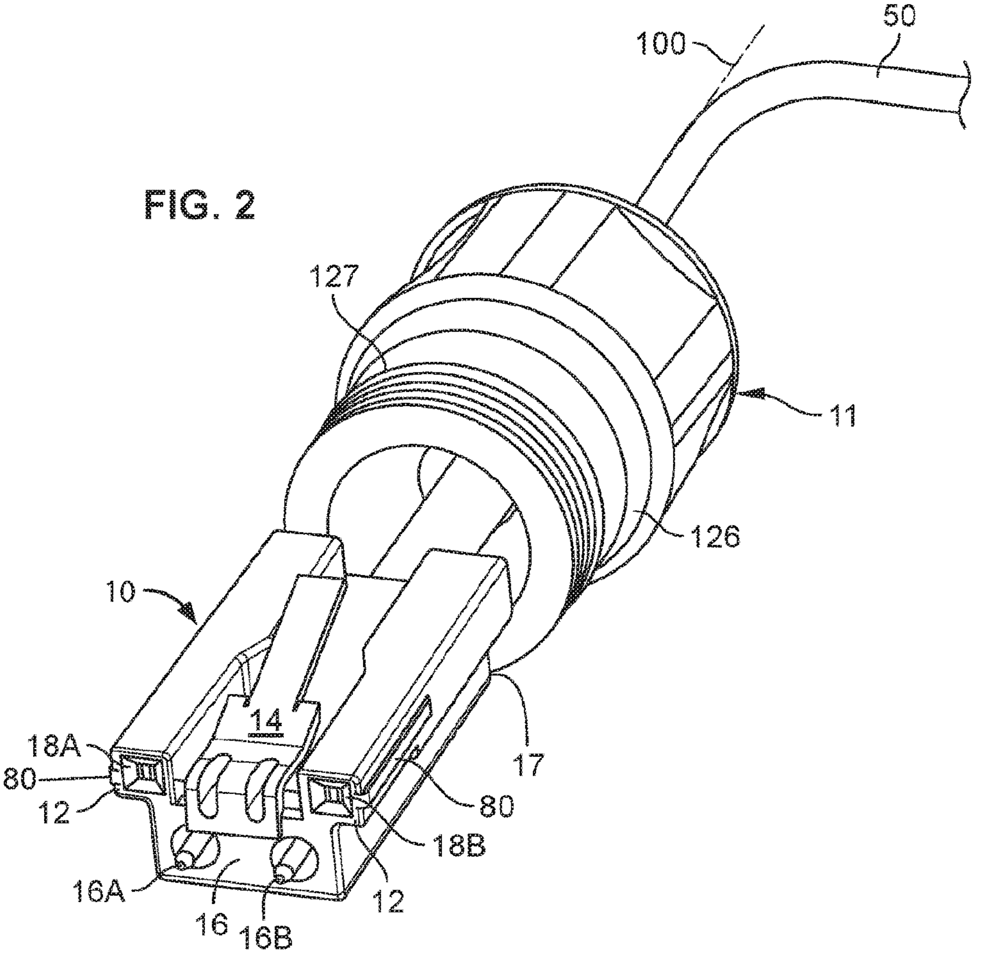

HYBRID FIBER POWER CONNECTION SYSTEM

CROSS-REFERENCE TO RELATED APPLICATION

This application is a National Stage Application of PCT/US2016/014960, filed on Jan. 26, 2016, which claims the benefit of U.S. Patent Application Ser. No. 62/107,894, filed on Jan. 26, 2015, the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to fiber optic connectors used in optical fiber communication systems.

BACKGROUND

Fiber optic telecommunications technology is becoming more prevalent in part because service providers want to deliver high bandwidth communication capabilities to customers. A typical fiber optic telecommunications system includes a network of fiber optic cables (e.g., distribution cables or branch cables such as drop cables or stub cables) routed from a central location (e.g., a service provider's central office) to remote locations in close proximity to subscribers. The fiber optic telecommunications systems also can include additional components, such as fiber distribution hubs housing optical splitters for splitting optical signals and drop terminals providing interconnect locations for facilitating connecting subscribers to the fiber optic network.

A typical fiber optic connector includes a ferrule assembly supported at a distal end of a connector housing. A spring is used to bias the ferrule assembly in a distal direction relative to the connector housing. The ferrule functions to support an end portion of at least one optical fiber. In the case of a multi-fiber ferrule, the ends of multiple fibers are supported. When the fiber optic connectors are connected, their respected optical fibers are coaxially aligned so that an optical signal can be transmitted from optical fiber to optical fiber through the aligned optical fibers. For many fiber optic connector styles, alignment between two fiber optic connectors is provided through the use of an intermediate fiber optic adapter.

SUMMARY

One aspect of the present disclosure relates to a hybrid multi-fiber connector having features that facilitate connector assembly. The hybrid multi-fiber connector includes a connector body that includes a main body having two sub bodies that project from a first side of the main body, and a latching mechanism at the first side of the main body positioned between the sub bodies.

The connector body has electrical conductors positioned in the sub bodies that have interface ends at a forward face of the main body. The connector body also has a first and a second ferrule mounted at the main body. The first and second ferrule are spring biased in a forward direction perpendicular to the forward face of the main body. The first and second ferrules have interface ends accessible at the forward face. The first and a second ferrules have a rear end and a front contact face. Optical fibers extend from the front contact face to the rear end, with a plurality of optical contacts positioned along the front contact face. The ferrule includes a plurality of optical fiber passages through which the plurality of optical fibers extend.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 1 is a front end view of a connector body;

FIG. 2 is a perspective view of the connector assembly, including the connector body and a rear housing of the connector body of FIG. 1.

DESCRIPTION

Figure 3:
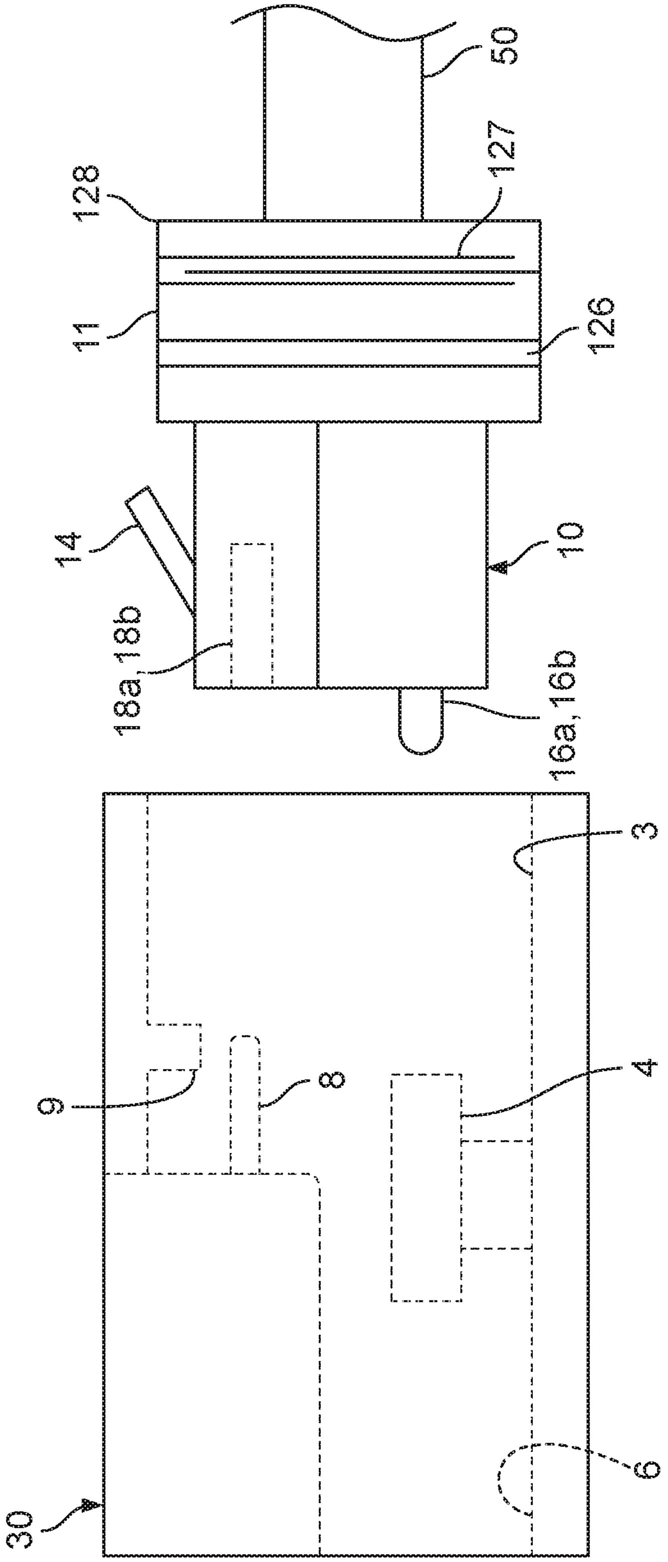
FIG. 3 is a schematic block diagram of the connector assembly of FIG. 2 aligned with a port of an example adapter configured to receive the connector assembly.

FIGS. 1 and 2 illustrate a connector body 1 configured to terminate a hybrid cable 50 in accordance with the principles of the present disclosure. The hybrid cable 50 includes a jacket surrounding at least one optical fiber and at least one electrical conductor. In certain examples, the hybrid cable 50 includes a plurality of optical fibers (e.g., optical fibers 19*a*, 19*b*). In certain examples, the hybrid cable 50 includes a plurality of electrical conductors (e.g., electrical conductors 18*a*, 18*b*). In certain examples, the hybrid cable 50 includes a plurality of optical fibers and a plurality of electrical conductors.

The connector body 1 has a main body 10 and a rear housing 11. The connector body 1 also includes two sub bodies 12 disposed at a first side of the main body 10. The sub bodies 12 are attached to the main body 10. In certain implementations, the sub bodies 12 are composed of the same material as the main body 10. In certain examples, the sub bodies 12 are integral with the main body 10. In certain examples, each sub body 12 has a rail that extends laterally outwardly.

The main body 10 includes a latching mechanism 14 at the first side of the main body 10 positioned between the sub bodies 12. The latching mechanism 14 allows the connector body 1 to be secured to a fiber optic adapter when the connector body 1 is received at a port of the adapter.

The main body 10 defines an end face at which an optical interface and an electrical interface are accessible. In some implementations, the optical interface includes an end face of an optical fiber 19A, 19B. In certain implementations, the optical fiber is carried by an optical ferrule 16A, 16B accessible at the end face. In an example, the ferrule 16A, 16B and end face of the optical fiber 19A, 19B extend forwardly of the end face.

In certain implementations, the optical interface includes a plurality of optical fibers 19A, 19B. In the example shown, the main body 10 includes a first ferrule 16*a* and a second ferrule 16*b*. The first and second ferrules 16*a*, 16*b* are spring biased in a forward direction perpendicular to the forward face 16 of the main body 10. The first and second ferrule 16*a*, 16*b* also have interface ends accessible at the forward face 16. The first and second ferrule 16*a*, 16*b* may have a center-to-center spacing compatible with a standard duplex LC adapter. Each ferrule 16*a*, 16*b* includes a ferrule, a hub, and a spring. Each ferrule 16*a*, 16*b* mounts at least partially within the main body 10.

In certain implementations, the electrical interface includes an electrical contact. In some examples, the electrical contact is disposed at the end face. In other examples, the electrical contact is disposed within a passage having an open end at the end face. In still other examples, the electrical contact may be disposed forwardly of the end face. In certain examples, the main body 10 includes electrical conductors 18*a*, 18*b* that are each positioned within one of the sub bodies 12. These electrical conductors 18*a*, 18*b* have interface ends at a forward face 16 of the main body 10. The electrical conductors 18*a*, 18*b* may extend through the sub bodies 12 of the connector body 1 into the hybrid-fiber optic cable 50. Example electrical conductors 18*a*, 18*b* may include elongated wires that are capable of carrying or transmitting an electrical signal.

In certain implementations, the main body 10 has a first portion and a second portion. The first portion defines the electrical interface and the second portion defines the optical interface. The first portion is wider than the second portion. For example, the first portion of the main body 10 may be located at the first side of the main body and the second portion may be located at a second side opposite the first side. In certain examples, a portion of the latching member 14 is disposed between two electrical contacts 18A, 18B. In certain examples, a portion of the latching member 14 is disposed between the optical ferrules 16A, 16B.

FIG. 3 shows an example adapter 30 extending from a first end to a second end. The first end of the adapter 30 defines a port 3 that is configured to receive the connector body 1 of FIGS. 1 and 2. The second end of the adapter 30 defines a port 6 that is configured to receive a mating connector. In certain examples, the port 6 is configured to receive an optical connector plug (e.g., a simplex optical plug, a duplex optical plug, etc.). In an example, the port 6 is configured to receive a duplex LC optical plug connector. In certain examples, the port 6 is not configured to receive electrical conductors.

The adapter 30 includes an alignment sleeve arrangement 4 accessible via the ports 3, 6. A first end of the alignment sleeve arrangement 4 is configured to receive the ferrules 16*a*, 16*b* of the connector body 1. A second end of the alignment sleeve arrangement 4 is configured to receive one or more ferrules of a mating connector.

The adapter 30 also includes one or more contacts 8 for the electrical conductors 18*a*, 18*b* of the connector body 1. For example, the adapter 30 can include first and second contact pins 8 spaced laterally part in alignment with the electrical conductors 18*a*, 18*b* of the connector body. The contacts 8 are sized and configured to mate with the electrical conductors 18*a*, 18*b* of the connector body 1. In some implementations, the contacts 8 are connected to electrical conductors (e.g., wires) that connect the contacts 8 to electrical equipment (e.g., equipment holding the adapter, equipment adjacent the adapter, etc.). In other implementations, the contacts 8 can be configured to mate with electrical conductors 18*a*, 18*b* of the mating connector.

The adapter 30 also includes a latching member 9 at which the latching mechanism 14 of the connector body 1 engages to axially secure the connector body 1 to the adapter 30. The port 3 also can include a robust mounting structure to secure the connector body 1 to the adapter 30. For example, the port 3 can include a twist-to-lock mounting structure (e.g., threads, part of a bayonet connection, etc.) as will be discussed in more detail herein.

As shown in FIGS. 2 and 3, the connector body 1 may also include a rear housing 11 that slidably mounts over the main body 10. In certain examples, the rear housing 11 also includes a seal 126 (e.g., a watertight seal such as an O-ring) configured to engage a sealing wall of the adapter 30 to inhibit any fluids or moisture from contaminating the connector body 1 once connected with the fiber optic adapter 30. The distal end 128 of the rear housing 11 is configured to receive, anchor and provide strain relief/bend radius protection to the hybrid-fiber optic cable 50. In alternative implementations, the rear housing 11 can define the sealing surface and the adapter 30 can hold the seal.

In certain examples, the rear housing 11 is configured to axially secure the connector body 1 to an adapter 30 or other port. In certain implementations, the rear housing 11 has a twist-to-lock configuration. In certain examples, the rear housing 11 defines threads 127 (e.g., external threads and/or internal threads) that mate with threads defined at the port 3. In certain examples, the rear housing 11 defines a bayonet connection that mates with bayonet connection structure at the port 3.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A connector body comprising:

a main body having a first side and a forward face;

two sub bodies that project from the first side of the main body;

a latching mechanism disposed at the first side of the main body and positioned between the two sub bodies;

electrical conductors positioned in the sub bodies, the electrical conductors having interface ends at the forward face of the main body;

first and second ferrules mounted at the main body, wherein the first and second ferrules are spring biased in a forward direction perpendicular to the forward face of the main body, the first and second ferrules having interface ends accessible at the forward face;

optical fibers supported by the first and second ferrules; and a rear housing disposed at the main body, the rear housing having a nut rotatable about the main body and a seal located along threads of the nut.

2. The connector body of claim 1, wherein the first and second ferrules have a center-to-center spacing compatible with a standard duplex LC adapter.

3. The connector body of claim 1, wherein the main body has an end face from which the first and second ferrules protrude, the end face defining apertures leading to rearwardly extending passages in which the electrical conductors are disposed and through which the electrical conductors are accessible.

4. The connector body of claim 1, wherein the seal is configured to create an environmental seal between the rear housing and a port receiving the main body.

5. The connector body of claim 1, wherein the electrical conductors and optical fibers are surrounded by a jacket to form a hybrid cable terminated by the connector body.

6. The connector body of claim 1, wherein the two sub bodies form a first portion of the connector body, and the first and second ferrules form a second portion of the connector body, wherein the first portion is wider than the second portion.

* * * * *